(No Model.)  3 Sheets—Sheet 1.
C. KETTRON.
ROTARY STEAM ENGINE.

No. 507,738.   Patented Oct. 31, 1893.

WITNESSES:
J. J. Price
H. W. Cummings

INVENTOR
Charles Kettron (No Model.) 3 Sheets—Sheet 2.

C. KETTRON.
ROTARY STEAM ENGINE.

No. 507,738. Patented Oct. 31, 1893.

WITNESSES:
T. J. Price
H. W. Cummings

INVENTOR
Charles Kettron (No Model.) 3 Sheets—Sheet 3.
C. KETTRON.
ROTARY STEAM ENGINE.
No. 507,738. Patented Oct. 31, 1893.
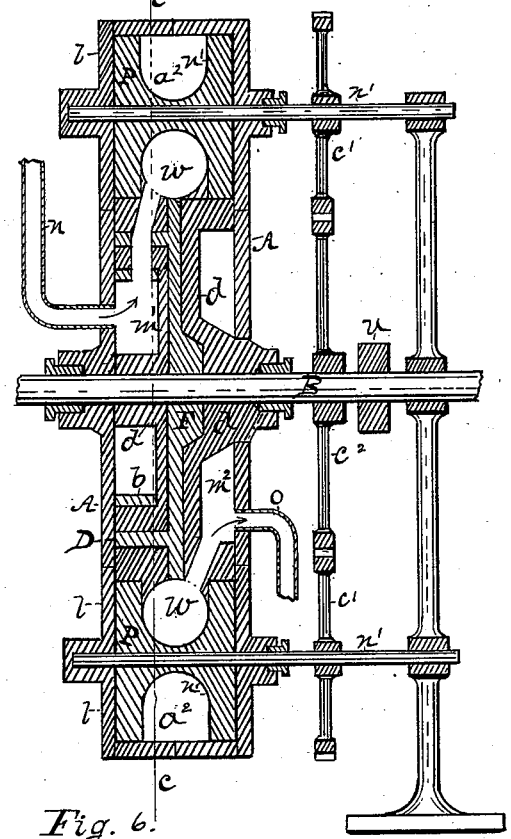
Fig. 4.
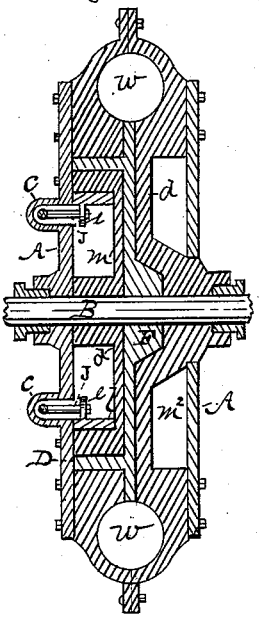
Fig. 5.
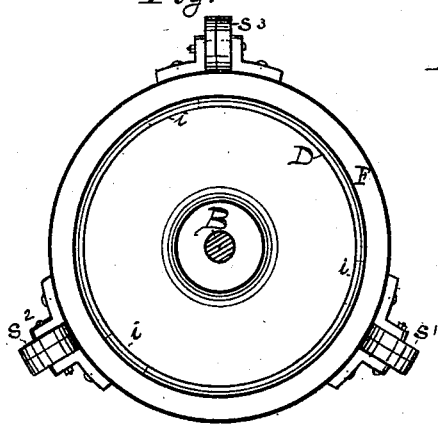
Fig. 6.
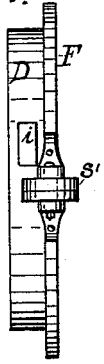
Fig. 7.
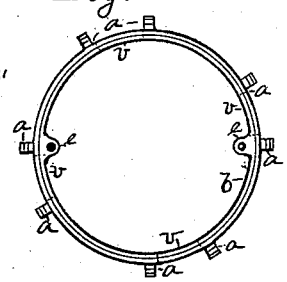
Fig. 9.
Fig. 8
WITNESSES:
T. J. Price
H. W. Cummings
INVENTOR
Charles Kettron

UNITED STATES PATENT OFFICE.

CHARLES KETTRON, OF MACOMB, ILLINOIS.

ROTARY STEAM-ENGINE.

SPECIFICATION forming part of Letters Patent No. 507,738, dated October 31, 1893.

Application filed January 3, 1893. Serial No. 456,985. (No model.)

*To all whom it may concern:*

Be it known that I, CHARLES KETTRON, a citizen of the United States, residing at Macomb, in the county of McDonough and State of Illinois, have invented a new and useful Improvement in Rotary Steam-Engines, of which the following is a specification, which will enable others skilled in the art to make and use the same, reference being had to the accompanying drawings, forming a part of this specification, in which—

Figure 1:
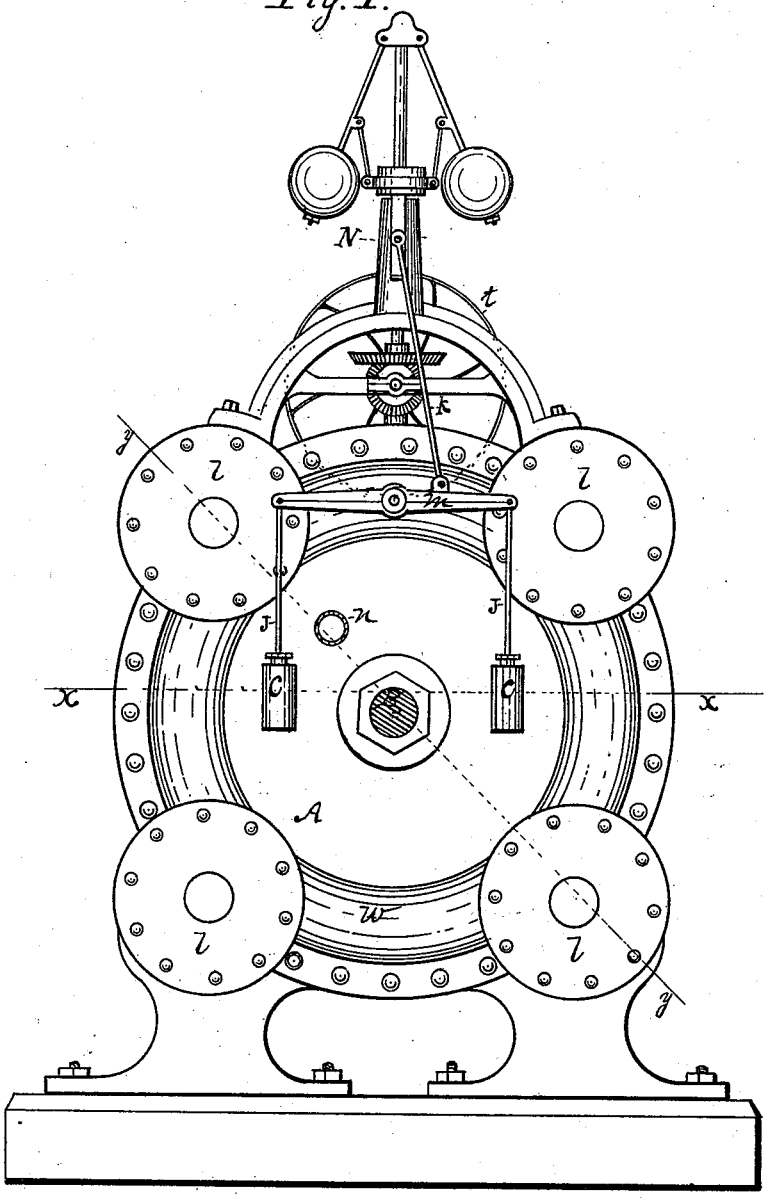
Figure 3:
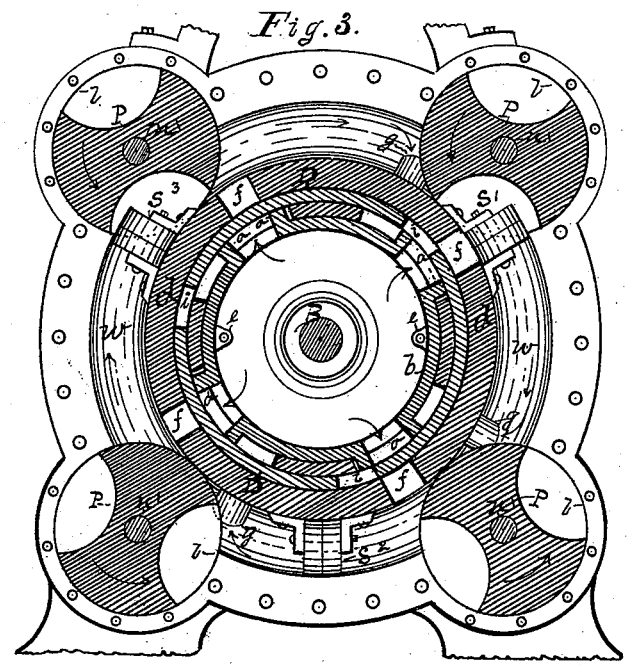
Figure 2:
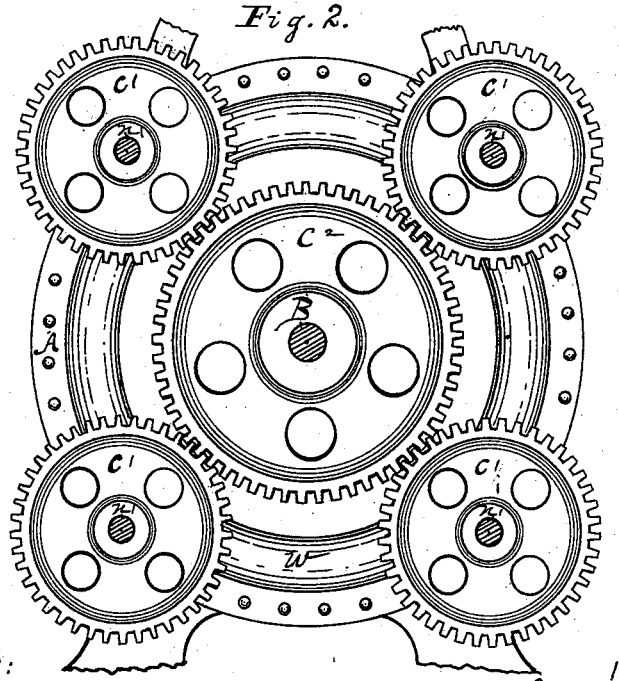

Figure 1, is a front elevation. Fig. 2 is a rear elevation, the governor being cut away. Fig. 3, is a sectional elevation on the line $c$, $c$, Fig. 4. Fig. 4, is a diagonal cross section on the line $y$, $y$, Fig. 1. Fig. 5, is a cross section on the line $x$, $x$, Fig. 1. Figs. 6, 7, 8, and 9 are detached parts of the mechanism which will be referred to in their respective places in the following description.

The nature and object of my invention will be fully understood from the drawings and specification which will enable others skilled in the art to make and use the same.

A in the several views represents the outer metal casing constructed in two parts which are firmly secured together by bolts; in the casing is formed the circular cylinder $w$, and at right angles thereto and at equal distances apart are formed cylinders $l$, $l$, $l$, $l$. In the cylinder $w$, are fitted the pistons $s'$, $s^2$, $s^3$, which are firmly secured to the disk F, at equal distances apart on its periphery; the disk is firmly secured to the main shaft B, and is formed with an outward projecting ring D, integral therewith; in said ring are formed three steam ports $i$, $i$, $i$, which are placed at equal distances apart just in the rear of each of the pistons $s'$, $s^2$, $s^3$. Said disk is fitted in the housing $d$, $d$, which is firmly secured to the casing A. Said housing forms a steam chamber $m'$, on the front side and an exhaust chamber $m^2$, in the rear. See Fig. 4.

P, P, P, P, represent rotary valves fitted steam tight in the cylinders $l$, $l$, $l$, $l$. Said valves have circular openings $a^2$, cut in each side of their respective peripheries. The inner circumferences of the cylinders $l$, $l$, $l$, $l$, are even with the inner circumference of the circular cylinder $w$, and by means of the valves P, P, P, P, the circular cylinder $w$, is formed into four equal compartments each of which when in operation acts independently of the other (see Fig. 3). The valves P, P, P, P, are secured to the shafts $n'$, $n'$, $n'$, $n'$, which pass outward in the rear and are journaled in a suitable frame work; to said shafts the spur wheels $c'$, $c'$, $c'$, $c'$, are firmly attached. Said wheels gear into and receive motion from the spur wheel $c^2$, which is firmly secured to the main shaft B (see Fig. 2), the proportion in size of the gear wheels being such that the wheels $c'$ $c'$ $c'$ $c'$ make one and one half revolutions to one of the wheel $c^2$. Consequently the valves P, P, P, P, make the same revolutions to one of the disk F. This manner of construction allows the valves P, P, P, P, to be so adjusted on their respective shafts that each of them will turn to the right place and at the right time to allow the pistons $s'$, $s^2$, $s^3$, to pass through the openings $a^2$, in said valves respectively as the pistons $s'$, $s^2$, $s^3$ pass around in the circular cylinder $w$. As soon as one of the pistons passes into the openings $a^2$, the valve closes up the cylinder $w$, in the rear. Then the piston commences to receive steam at $s'$. The other pistons are operated upon in the same manner as they pass through the said openings $a^2$ in the valves P.

$c$, $c$, represent two projecting tubes secured to the casing A, the upper ends being fitted with packing boxes. The cross beam $m$, is pivoted at the center to the casing A; at one side of the center of said beam is pivoted the rod K, the upper end of which is pivoted to the governor N, which is constructed in the usual manner and is operated by means of a belt from the pulley $u$, in the main shaft B, to the band wheel $t$, on the governor frame. The connecting rods J, J, at their upper ends are pivoted to the outer ends of the beam $m$. Their lower ends pass into the projecting tubes $c$, $c$, and down to near their centers where said rods are bent inward at right angles (see Fig. 5) passing into the ring $b$, where they are pivoted to the ears $e$ $e$, thereon. Said ring $b$, is fitted to the inner circle of the housing $d$, and is provided with outward projecting ribs $a$, $a$, on its periphery and steam ports $v$, $v$ which are placed opposite the steam ports $f$, $f$, $f$, $f$, in the housing $d$. In operation the ring $b$, is rotated a short distance which by means of the projecting ribs partly opens or closes the ports $f$, $f$, $f$, $f$, according to the speed and power required by the engine. The governor ring $b$, is shown detached in Figs. 8 and 9.

In operation the steam enters the chamber $m'$ through the pipe $n$. See Fig. 4. Thence it passes into the cylinder $w$, through the ports $f, f, f, f$, in the housing $d$, as shown in Fig. 3, by arrows. At the upper right hand in said figure, the piston $s'$, is just passing out of the openings $a^2$, in the valve P; the port $i$, in the projecting ring D, of the disk F, has just come into position to admit steam into the port $f$. Steam passes into the cylinder $w$, in the rear of the piston $s'$. The valve P, having closed the cylinder $w$, in the rear of the piston the full force of steam then acts against the piston $s'$, which causes the disk F to commence a revolution with full force of steam in that compartment in the cylinder $w$, and before the piston $s'$, reaches the next valve P, the piston $s^3$, has passed through the valve P, on the left and is receiving a full force of steam, Consequently all the pistons are acted upon in the same manner. By having one more of the valves P, than the pistons $s$, causes two of the pistons to be under full force of steam at the same time. The exhaust ports $g, g, g, g$, are always open in front of the pistons which prevent any back pressure of the steam. The exhaust steam passes out at the pipe $o$.

Having thus described my invention, what I claim as new, and desire to secure by Letters Patent, is—

1. In a rotary steam engine the casing A, in two parts in which is formed a circular cylinder, and at right angles thereto fitted in said cylinder four rotary valves forming the cylinder into four equal compartments, and said casing having also formed therein the housing $d, d$, in which is formed steam ports $f, f, f, f$, and steam and exhaust chambers in combination with the shaft B, disk F, having on its periphery the pistons $s', s^2, s^3$ and integral therewith the outward projecting ring D, in which is formed steam ports $i, i, i$, substantially as shown and described.

2. In a rotary steam engine the combination with the casing A, in two parts having fitted therein the housing $d, d$, in which is formed steam ports $f, f, f, f$, and steam and exhaust chambers, the governing ring $b$, having steam ports $v, v, v, v$, outward projecting ribs $a, a$, and inward projecting ears $e, e$, said ring $b$, being connected to and operated by the governor N, by means of the rod K, cross beam $m$, and rods J, J, substantially as shown and described for the purpose set forth.

CHARLES KETTRON.

Witnesses:
T. J. PRICE,
H. W. CUMMINGS.